FEEDBACK INTEGRATOR WITH GROUNDED CAPACITOR
Filed Dec. 28, 1967
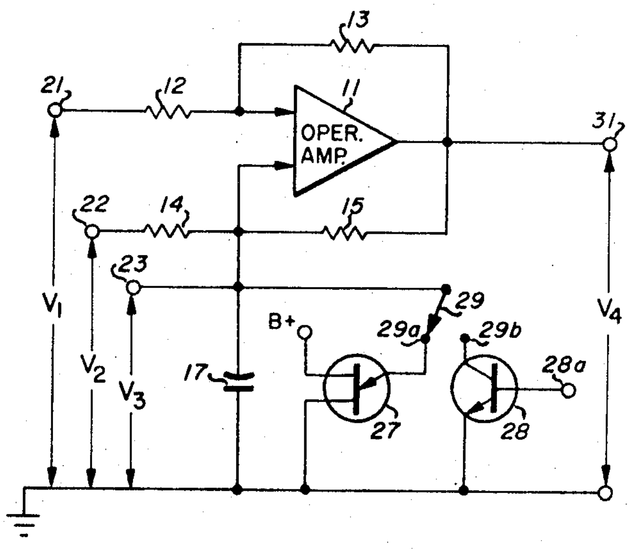
INVENTOR.
GORDON J. DEBOO
BY
ATTORNEYS 3,470,495

FEEDBACK INTEGRATOR WITH GROUNDED CAPACITOR

Gordon J. Deboo, Sunnyvale, Calif., assignor to the United States of America as represented by the Administrator of the National Aeronautics and Space Administration Filed Dec. 28, 1967, Ser. No. 694,345
Int. Cl. H03k *3/26*
U.S. Cl. 331—111 6 Claims

ABSTRACT OF THE DISCLOSURE

A feedback integrator employs a capacitor having one terminal grounded and the other terminal connected to one input of an operational amplifier. Input signals are applied through equal resistors to the amplifier input terminals, and the circuit operates to integrate the difference between the input signals. The polarity of the output may be controlled by appropriate connection of the inputs. Switching elements may be connected across the capacitor to produce either a free running or a controlled sweep generator. This control may also be used to reset the capacitor to an initial value when a variable input signal is being integrated.

The invention described herein was made by an employee of the United States Government and may be manufactured and used by or for the Government for governmental purposes without the payment of any royalties thereon or therefor.

BACKGROUND OF THE INVENTION

Field of the invention

This invention relates in general to integrating circuits, and relates more particularly to such integrating circuits employing a grounded capacitor.

Description of the prior art

Electronic integrators which automatically give an output which is the mathematical integral of the input signal are well-known in the art and are widely used in computing and control circuits. Such integrators usually employ an operational amplifier with negative feedback from the output to the inverting input through a capacitor. Such integrators work satisfactorily for many situations, but because the capacitor is floating, they do produce difficulties when it is desired to set and reset the integrator to some initial condition, as is often desired in analog computer circuitry. Further, when it is desired to integrate a differential signal (that is, the difference between two input signals), it is necessary in these prior art devices to employ two capacitors, thus increasing the complexity and cost of the circuit, and increasing the difficulties of setting the initial conditions as discussed above. Additionally, these conventional integrators produce only a single inverted output signal for a single-ended input signal, whereas signals of the opposite polarity may be desired.

SUMMARY OF THE INVENTION

In accordance with this invention, there is provided an integrating circuit employing a single grounded capacitor, four resistors and an operational amplifier. Two input terminals are provided, and when signals are applied to both of these terminals, the circuit operates to integrate the differential input represented by the difference between the two input signals. Thus, the circuit performs this integration on the differential input using only a single capacitor, in contrast to the two capacitors required to perform this operation in the prior art devices.

When one of the input terminals is grounded and a signal applied to the other, the integrator acts as a non-inverting integrator, while when the situation of the input signals is reversed, the integrator acts as an inverting integrator. Thus, by grounding the appropriate input terminal, a choice of polarities is available at the output for a given single-ended input signal. Similarly, output polarity selection is possible for the differential signal inputs by appropriate connection of the input signals to the input terminals.

Further, by utilizing electronic transistor switches connected across the capacitor, the capacitor may be readily reset in various modes of operation. Additionally, a low impedance output with a gain twice that of conventional integrators is available at the output terminal of the operational amplifier, with the same ease of resetting of the capacitor.

It is therefore an object of this invention to provide an improved integrating circuit employing a grounded capacitor.

It is a further object of this invention to provide an integrating circuit which is capable of integrating differential input signals utilizing only a single capacitor.

It is an additional object of the present invention to provide an integrating circuit which permits ready selection of the polarity of the output signal independently of the polarity of the input signal.

It is a further object of this invention to provide an integrating circuit which is capable of integrating a differential input signal to produce an output signal of either polarity.

It is an additional object of the present invention to provide an integrating circuit employing a capacitor which can be readily set and reset to initial conditions.

BRIEF DESCRIPTION OF THE DRAWINGS

Objects and advantages other than those set forth above will be apparent from the following description when read in connection with the accompanying drawing, the single figure of which is a circuit diagram of an integrator according to the present invention, including electronic switches for setting and resetting the integrator circuit.

DESCRIPTION OF THE PREFERRED EMBODIMENT

Referring to the drawing, the integrator of this invention includes an operational amplifier 11, four equal resistors 12, 13, 14, 15 and a capacitor 17. Capacitor 17 has one terminal connected to ground and has its other terminal connected to an input terminal of amplifier 11 at the junction of resistors 14, 15. The other input terminal of amplifier 11 is connected to the junction of resistors 12, 13.

A pair of input terminals 21, 22 are provided as shown, the voltage of terminal 21 being designated $V_1$ and the voltage at terminal 22 being designated $V_2$. The circuit output voltage appears at a terminal 23 whose voltage is designated $V_3$.

Considering only the portion of the circuit described thus far, it will be seen that the circuit output voltage is:

$$V_3=(1/RC)\int_0^t(V_2-V_1)dt$$

where R is the resistance of any one of the equal resistors 12, 13, 14 and 15, and C is the capacitance of capacitor 17. This shows clearly that the circuit is operative to integrate the differential input signal represented by the difference between the signals on terminals 21 and 22. This integration of the differential input is accomplished with only the single capacitor 17, unlike the prior art devices which require two capacitors to perform this operation.

When terminal 21 is grounded ($V_1=0$) the circuit operates as a non-inverting integrator to integrate the signal appearing at terminal $V_2$. Conversely, with terminal 22 grounded ($V_2=0$), the circuit will operate as an inverting integrator for the input signal appearing on terminal 21. Thus, with single-ended signals it is possible to select a desired output polarity by grounding the appropriate input terminal and connecting the input signal to the other input terminal. Similarly, output polarity selection is possible in the case of differential input signals by appropriate connection of these input signals to the two input terminals.

To reset capacitor 17 in various modes of operation, two transistors 27, 28 may be employed and connected as shown. These transistors are selectively connectable to the integrating circuit by means of a switch 29 having a contact **29*a* which connects unijunction transistor 27 to the integrator, and a contact 29*b* which connects bipolar transistor 28** to the integrator.

Consider first the case where the circuit is to be used as a ramp or sweep generator. Assume that the voltage $V_1$ is zero and the voltage $V_2$ is a positive constant voltage. The circuit output voltage $V_3$ will then be a linear sweep with a slope of $V_2/RC$ volts per second. With switch 29 in a position to close contact **29*a*, the circuit operates in a free-running mode owing to the voltage-sensing switching action of unijunction transistor 27 across capacitor 17**.

When switch 29 is moved to close contact **29*b*, the sweep can be made to start and stop at selected times by application of positive and negative voltages, respectively, to the base of bipolar transistor 28 through terminal 28*a***, so that the circuit operates as a triggered sweep in response to these positive and negative voltages. Thus, the circuit may be employed to generate either a free-running or a controlled sweep pattern.

The circuit may also be used to set and reset capacitor 17 to an initial value, as is often required in analog computer circuits.

When the voltage $V_1$ is zero and the voltage $V_2$ is a positive, variable voltage to be integrated, by application of suitable control pulses to terminal **28*a*, transistor 28 can be used to set an initial condition of $V_3=0$ and to reset the integrator when desired. The simplicity of switching involved in all of these modes of operation is a direct result of grounding one terminal of the capacitor 17**.

If a low impedance output is required from the circuit shown in the drawing, it is available at the amplifier output terminal 31. The voltage $V_4$ at this terminal is:

$$V_4=(2/RC)\int_0^t(V_2-V_1)dt-V_1$$

If the voltage $V_1$ is made zero, and the voltage $V_2$ is the variable to be integrated, a low impedance source of $$V_4=(2/RC)\int_0^t V_2 dt$$

is available at terminal 31, with the same ease of resetting capacitor 17 as before. It will be seen that the gain for this low impedance output is twice that of conventional integrators.

With respect to the components utilized in the circuit, these may be varied over a wide range. With high quality operational amplifiers, the integrator circuit will work well with resistor values for R from a few kilohms to many megohms, and with values of capacitance for capacitor 17 from a few hundred picofarads to hundreds of microfarads. Component tolerance depends on the accuracy desired, and in general, the design philosophy and component selection is to minimize error introduced by deviation from the idealized circuit. The capacitor leakage should be low, and the amplifier should have high open-loop gain, high input impedance and low output impedance. The input voltage and current offsets should be low, and thermally stable. The resistor values selected should not be too low because this would reduce the circuit's output drive capability.

Without limiting the invention in any way, the following values for the components shown in the drawing were utilized to construct a linear ramp generator in a ratemeter circuit, and the operation of the circuit was highly satisfactory.

R—10,000 ohms
C—1 microfarad
Transistor 27—2N2646
Transistor 28—2N3565
Amplifier 11—Fairchild ADO-3
Power—±15 volts While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. An integrating circuit comprising:
an operational amplifier having first and second input terminals and an output terminal;
a first resistor connected between said first amplifier input terminal and said output terminal;
a second resistor connected between said second amplifier input terminal and said output terminal;
a reference terminal;
a capacitor connected between said second amplifier input terminal and said reference terminal;
first and second signal input terminals;
a third resistor connected between said first amplifier input terminal and said first signal input terminal; and
a fourth resistor connected between said second amplifier input terminal and said signal input terminal, whereby when first and second signals are applied to said first and second signal input terminals, an output signal proportional to the integral of the difference of said two signals is generated.

2. A circuit in accordance with claim 1 in which said first signal input terminal is connected to said reference terminal, whereby a signal applied to said second signal input terminal and said reference terminal is integrated without inversion.

3. A circuit in accordance with claim 1 in which said second signal input terminal is connected to said reference terminal, whereby a signal applied to said first signal input terminal is integrated with inversion.

4. A circuit in accordance with claim 1 including means connectable across said capacitor for setting the charge on said capacitor and for periodically resetting said charge to said initial value.

5. A circuit in accordance with claim 1 including a unijunction transistor having a first base, a second base and an emitter, said first base being connected to said reference terminal, a voltage source connected across said first and second bases, and said emitter connected to said second amplifier input, whereby when a signal of zero volts is applied across said first signal input terminal and said reference terminal and a voltage of constant value is applied across said second signal input terminal and said reference terminal, a free-running linear sweep voltage is generated.

6. A circuit in accordance with claim 1 including a transistor having a base, collector and emitter, said collector being connected to said second amplifier input terminal, and said emitter being connected to said reference terminal, whereby the charging of said capacitor is started and stopped when negative and positive voltages, respectively, are applied to said transistor base.

References Cited

Chapman: "Period of Sawtooth Ramp Extends to 5 Hours," Electronics, June 27, 1966, 1 page reprint.

Picciano et al.: "Electronic Integration System for Low Level Fast Signals," IBM Technical Disclosure Bulletin, vol. 4, No. 12, May 1962, pp. 105, 106.

ROY LAKE, Primary Examiner
S. H. GRIMM, Assistant Examiner

U.S. Cl. X.R.

235—183; 307—228, 229, 276; 328—127; 331—153